US006999458B2

(12) United States Patent
Fowler

(10) Patent No.: US 6,999,458 B2
(45) Date of Patent: Feb. 14, 2006

(54) INTERNET TELEPHONY NETWORK AND METHODS FOR USING THE SAME

(75) Inventor: Brian Fowler, Sunrise, FL (US)

(73) Assignee: theglobe.com, Ft. Lauderdale, FL (US)

( * ) Notice: Subject to any disclaimer, the term of this patent is extended or adjusted under 35 U.S.C. 154(b) by 210 days.

(21) Appl. No.: 10/366,372

(22) Filed: Feb. 14, 2003

(65) Prior Publication Data

US 2004/0160946 A1    Aug. 19, 2004

(51) Int. Cl.
*H04L 12/28*    (2006.01)
(52) U.S. Cl. .............................. 370/395.31; 379/88.17; 707/10
(58) Field of Classification Search ................ 370/259, 370/270, 352–354, 356, 395.31, 395.52, 370/395.54, 401, 466, 467; 379/88.17, 88.18, 379/114.01, 114.2, 158, 211.02; 709/227–233, 709/238; 707/10
See application file for complete search history.

(56) References Cited

U.S. PATENT DOCUMENTS

| 5,608,786 | A | | 3/1997 | Gordon |
| 6,067,350 | A | | 5/2000 | Gordon |
| 6,185,288 | B1 | * | 2/2001 | Wong .......................... 379/219 |
| 6,353,660 | B1 | * | 3/2002 | Burger et al. ............ 379/88.17 |
| 6,392,999 | B1 | * | 5/2002 | Liu et al. ..................... 370/260 |
| 6,614,784 | B1 | * | 9/2003 | Glitho et al. ................ 370/352 |
| 6,834,100 | B1 | * | 12/2004 | Reynolds .................. 379/88.16 |
| 6,850,512 | B1 | * | 2/2005 | Bishop et al. .............. 370/342 |
| 2002/0004796 | A1 | * | 1/2002 | Vange et al. .................. 707/10 |
| 2003/0018700 | A1 | | 1/2003 | Giroti et al. |

OTHER PUBLICATIONS

Cisco Systems, "Technical Information Cisco AS5300/Voice Gateway Data Sheet", 1999, Cisco Systems, pp 1-12.*

* cited by examiner

*Primary Examiner*—Wellington Chin
*Assistant Examiner*—John Shew
(74) *Attorney, Agent, or Firm*—Fried, Frank, Harris, Shriver & Jacobson LLP

(57) ABSTRACT

A telephony network for enabling the origination and termination of telephone calls between one or more subscriber terminals connected to a public packet network with an open addressing protocol and one or more non-subscriber terminals connected to a PSTN network. Subscribers to the telephony network have E.164 numbers mapped to their current IP address and published by a mapping server so other subscribers and non-subscribers can call the subscriber. The mapped information is published on either a HTML or XML page for direct use over the Internet by other subscribers or for use by a gateway device. The gateway device enables non-subscribers on the PSTN to directly call subscribers. Calls between subscribers completely by-pass the PSTN. Subscribers can also call anyone with a phone number whether they are a subscriber or not.

7 Claims, 6 Drawing Sheets

INTERNET TELEPHONY NETWORK AND METHODS FOR USING THE SAME

SUMMARY OF THE INVENTION

The present invention is generally related to the field of Internet telephony, and particularly related to an Internet Protocol ("IP") based telephony system that allows for the origination and termination of phone calls to and from the Public Switched Telephone Network ("PSTN"). The present invention involves the mapping of subscribers' E.164 numbers to their current IP address and publishing the mapped information in a distributed form so other subscribers and non-subscribers can call the subscriber without reliance on a central answering position. The mapped information is published on either a Hyper Text Markup Language ("HTML") document or eXtended Markup Language ("XML") database for direct use over the Internet by other subscribers or for use by a gateway device. The gateway device enables non-subscribers on the PSTN to directly call subscribers. Calls between subscribers completely by-pass the PSTN. Subscribers can also call anyone with a phone number whether they are a subscriber or not.

BACKGROUND OF THE INVENTION

Traditional telephone service is circuit-switched—every call is transmitted over dedicated facilities reserved for that particular call. Long distance calls are transmitted from the user's phone line over copper wires to a local telephone company's network switch, which converts the call to digital format and hands it off to the long distance carrier. The long distance carrier then routes the call over its network to a local telephone company's network serving the call recipient. That carrier's local network switch re-converts the call to analog signals and connects the call to a dedicated line serving the recipient. As long as the call is ongoing, a circuit—a dedicated splice of bandwidth—remains open throughout all three networks involved in transmitting the voice signals. Both the called party and the calling party pay a fee to their local telephone company for access to each company's local network, and the calling party pays an additional fee, usually on a per minute basis, for use of the long distance carrier's network.

Internet-based telephone services, or IP telephony, presently offer significant benefits over traditional telephone service. Although users generally pay a fee for Internet access, it is usually a set amount on a monthly basis regardless of the amount of bandwidth used. If two people use the Internet to call one another, they can by-pass both local telephone companies' networks and the long distance carrier's network, without incurring additional fees for making such a call. This type of IP telephony, that does not require any intermediary service (charged at some price), is extremely inconvenient because it requires both users to be using the same software at the same time and to know that the other user is available on-line at the designated time of the call. Other technologies have been developed to enhance the convenience of calling, but services utilizing these technologies often require additional hardware devices to be installed on each user's system and have introduced other issues, such as service quality, which will be discussed more fully below.

Internet service providers are naturally interested in IP telephony because IP telephony increases the demand for access services. Customers have been reluctant to use IP telephony, however, because the quality of such services has not been as high as standard telephony and there have been significant limitations on who could be called using IP telephony. Nevertheless, Internet Telephony Service Providers ("ITSP") are realizing there is a significant marketing advantage associated with having the ability to offer IP telephony. Since some IP telephony services are of a lower quality than traditional telephony, this provides ITSP's a way to version their service on quality: high quality/high price and low quality/low price, with variations in between being developed. By offering multiple versions of their product, ITSPs can better match their products against their customer's needs and their willingness to pay. This enables them to extract the full value of their services from their customers.

A Voice over IP ("VoIP") system enables the transmission of telephone calls over an IP data network such as the Internet. A VoIP system handles a telephone call over most of the network as just another stream of data. Typically, an IP telephony user dials a toll-free number to connect the user to an IP telephony gateway. The gateway is the key element here, as it bridges the public telephone network and the public or private IP network providing the service. Once connected to the gateway, the user dials his or her account number (for billing purposes) and the destination phone number of the call. The gateway receives telephone signals on one side, converts them to IP packets, and outputs the packets to public or private IP networks for routing to the terminating user, and vice versa. A typical packet includes 10 to 30 milliseconds worth of conversation. Each packet is coded with the second party's phone number, and compressed for rapid transmission.

The packets travel the IP network, passing through routers, computers that operate like switches by reading the addresses on each packet and assigning them to appropriate transmission lines, to arrive at a gateway that decompresses them and converts the packets back into a voice transmission signal. The gateway then passes the call to the local phone network, which delivers it to the intended party.

One of the key challenges emerging from the integration between circuit switched (traditional phone) and packet switched (IP) networks is how to address calls that pass from one network service to another. Currently, it is possible to originate calls from IP address-based networks to other networks, however it is difficult to terminate calls from other networks, such as the PSTN, to IP address-based networks. Instead, calls from the PSTN are typically being terminated on the PSTN. For example, in PCT Application Number PCT/US99/29171, published as International Publication Number WO 00/41383, by Ranalli et al., a system is described for resolving a PSTN number to an IP address for voice communication between two simultaneous users over the Internet, but which system lacks an IP-enabled gateway for completing calls from an Internet user to a PSTN phone or from a PSTN phone to an Internet user. Hence, a calling party must use a standard terminal device, such as a phone, for connecting to another user on the PSTN. Therefore, there is a need for an addressing system across both PSTN and public packet networks that can allow a PSTN caller to access a subscriber on a public packet network and vice versa.

Although intermediate gateways exist, they present another problem in prior VoIP systems. As noted above, in some systems, a user is required to call a gateway, which then calls the recipient's number. This results in over dialing and may cause some calls to be blocked at the receiving end. Further, in other prior systems, the mapping data for logged on subscribers is not published in a public forum that can be accessed by other subscribers and gateways connected to PSTN terminals. Rather, the providers of such systems distribute a hardware device to subscribers only, who use that device to pull mapping data for other subscribers from a database server. Therefore there is a need for a system that handles the entire call without a central answering position (an over dialing gateway) and which allows any user, even if through an intermediary, easy public access to subscriber mapping data. The present invention allows subscribers to call other subscribers and completely bypass the PSTN local office by using a call agent browser to connect to a gateway device and to send mapping data and receive mapping data from other users via distributed servers. The call agent can be an applet or any specifically enabled Internet browser. The call agent can also support soft-phone software applications, provide a user profile, and other user information.

DETAILED DESCRIPTION OF THE INVENTION

Figure 1:
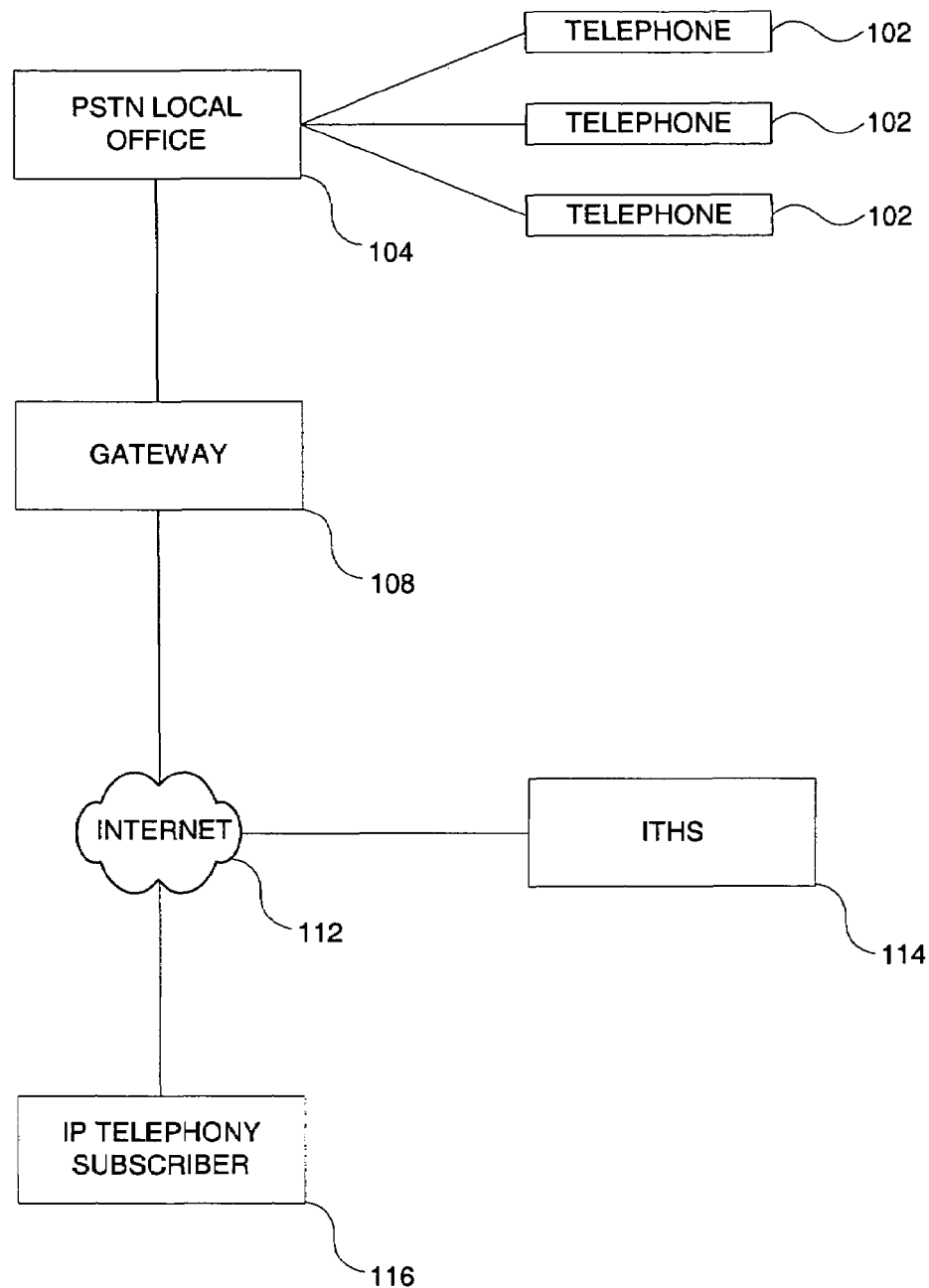
FIG. 1 is a block diagram illustrating the interface between the present invention and the Public Switch Telephone Network.

The present invention allows for the origination and termination of phone calls to and from any PSTN or IP enabled voice communication terminal by mapping public E.164 numbers or identifications ("IDs") for subscribers to their current Internet IP address. Mapped ID and address information for each subscriber is then published to an HTML document or an XML database for direct use by other logged on IP telephony subscribers or by a gateway that enables calls to and from non-subscribers. The gateway enables non-subscribers to directly call subscribers without a PSTN connection to the subscriber. Subscribers completely by-pass charges associated with the local PSTN and can call anyone with a unique identifier such as a phone number regardless of whether they on the PSTN.

The Internet is a data network that carries data in a digital form in specially formatted packets. This is contrasted with the PSTN, which is a circuit switched network. The Internet uses the TCP/IP protocol, which enables any TCP/IP device or network of devices to connect to the network and function as though they were part of a single network. In order to locate any specific point, or host, on the Internet, a unique IP address is used for each host. A host can have a dedicated IP address, as is frequently the case with large bandwidth access customers, or a dynamically generated IP address, as is the case with any dial-up user. Since IP addresses are numerical, and therefore difficult to remember, or dynamic, and therefore constantly changing, and because many users are connected to different hosts all the time, many users are also assigned more permanent types of addresses, such as a Simple Mail Transport Protocol ("SMTP") e-mail address or a Voice Profile for Internet Mail ("VPIM") voicemail system address. There are many other types of address mechanisms available on the Internet.

IP Telephony subscribers may gain access to the Internet through a number of different means. A roaming subscriber using a wireless device (e.g. 802.11a/b/g protocol compatible devices) could log onto the Internet from multiple locations. A subscriber relying on fixed access could only connect to the Internet through a wire-line, a cable-modem connection, etc. In accordance with the present invention, calls to an IP Telephony subscriber may originate from the PSTN through wireline or wireless telephones, or from other IP Telephony subscribers, provided the identity of the called number and a corresponding IP address is known to the calling party, which will be further discussed below in greater detail.

So as to technically accommodate the growing number of telephone users around the world, and increased interest in Internet telephony, the International Telecommunications Union ("ITU") has adopted a number of standards or protocols. One such protocol is E.164, which provides a uniform means for identifying any telephone number in the world to any telephony user in the world. This protocol has been widely adopted, along with other protocols, such as H.323 and H.450, which collectively operate to improve the quality and functionality of IP telephony. For purposes of the present invention, however, the E.164 protocol is most important. There are six different components to an IP telephony network that supports the E.164 protocol within the context of the preferred embodiment of the present invention:

(1) E.164. E.164 is the ITU-T recommendation for Global Switched Telephone Network ("GSTN") numbering. E.164 is a sixteen digit numbering scheme that provides a unique telephone number for every subscriber in the world. The E.164 address provides a globally unique, language independent identifier for resources on public telecommunication networks. E.164 numbers are used to identify ordinary phones, fax machines, pagers, and data modems.

(2) IP Address. An IP address is a 32-bit number that identifies the host that is sending or receiving information sent in packets across the Internet. When an Internet user attempts to locate a website by entering a Universal Resource Locator ("URL") request, the user is also sending the IP address for the host that the user is using at the time so HTML pages from the website can be returned to that user. The URL request includes an Internet domain name that is translated into a corresponding IP address to locate the host that is storing the requested website. E-mail messages and many other different types of messages sent or received by hosts must include IP addressing information in order operate. An IP address has two parts: an identifier of a particular network on the Internet; and an identifier of the particular host (the host can be a server or a workstation) within that network.

(3) File Transfer Protocol ("FTP"). FTP is a standard Internet protocol that represents the simplest manner of exchanging files between computers on the Internet. Like the Hypertext Transfer Protocol ("HTTP"), discussed below, which enables the transfer of displayable Web pages and related files, FTP is an application protocol that uses the Internet's TCP/IP protocols. FTP enables the transfer of specific files on one computer to a specific location on another computer. FTP is commonly used to transfer website files from their creator to the computer that acts as their server for everyone on the Internet. And ISP might, for example, operate an FTP-enabled server for providing IP address information and other information to its customers (4) The Hypertext Transfer Protocol. HTTP is the set of rules for exchanging files on the World Wide Web. Relative to the TCP/IP suite of protocols (which are the basis for information exchange on the Internet), HTTP is an application protocol. Essential concepts that are part of HTTP include (as its name implies) the idea that files contain references to other files whose selection will elicit additional transfer requests. Any Web server machine contains, in addition to the HTML and other files it can serve, an HTTP daemon, a program that is designed to wait for HTTP and FTP requests and handle them when they arrive.

(5) Hypertext Markup Language. HTML is the set of markup symbols, codes or words that are inserted in a file intended for display on a World Wide Web page. The markup tells a requesting browser how to display website pages, words and images for the user of that browser. Each individual markup code is referred to as an element. Some elements come in pairs that indicate when some display effect is to begin and when it is to end.

(6) IP Telephony Terminal. This term is generally used in to refer to a set of facilities for managing the delivery of voice information using IP. VoIP is one means of delivering voice data using the Internet Protocol. In general, VoIP refers to the process of sending voice information in digital form in discrete packets over the Internet, rather than sending voice information in analog form (or analog converted to digital and then converted back to analog form) in the traditional circuit-committed protocols of the PSTN.

While the preferred embodiment of the present invention relies on existing E.164 numbering management systems, the operation of the present invention is not dependent on these systems. At the present time, the ITU Telecommunication Standards Board assigns country/service codes, and within a geographic area, a national or regional numbering administration has the responsibility of managing the numbering plan for the countries assigned to that area. To have the E.164 number allocation process managed by the existing numbering plan administrations can expedite the allocation process, leading to an earlier deployment of Internet telephony services.

To operate IP telephony services in accordance with the present invention, IP telephony service providers will need to obtain blocks of E.164 numbers from numbering plan administrations for their subscribers. An IP telephony subscriber with a specific E.164 number will ordinarily subscribe to the service of one IP telephony service provider, such as their ISP. The service provider or a trusted third party provider will maintain the data related to that subscriber, including the IP address at which the subscriber can currently be reached, as will be described in further detail below in reference to FIG. 1.

FIG. 1 illustrates the interface between the IP telephony system of the present invention and the PSTN. Telephones 102 could be any type of conventional rotary or push-button phone. The same basic principles apply to wireless phone connecting to the PSTN through a cellular receiver/transmitter station (not shown), but only the more traditional phones 102 will be discussed with regard to FIG. 1. Telephone calls originating or terminating from wireline or wireless telephones 102 must pass through the PSTN local office 104. If a telephone call originated from telephone 102, the local office 104 would establish a contact with the telephone 102, look for the dialed number in a database, and then switch the call according to the instructions associated with the dialed number. In this case, the dialed number is handed over to the gateway 108, which sends an HTTP request over the Internet 112 to Internet Telephony Home Server ("ITHS") 114 to retrieve the IP address mapping data for the IP telephony subscriber 116 assigned to the E.164 ID dialed by the telephone 102. There may be only one ITHS 114, or multiple ITHS distributed around the IP telephony network. The ITHS is described in more detail with reference to FIG. 2 below. The gateway 108 could be specially designed software programmed hardware device, or an add-on card within an existing telecommunication system. On a PBX-class level, for example, a Dialogic Communications Corporation (Franklin, Tenn.) MultiTech Systems MultiVOIP 800 card mounted within a True Data Technology Inc. (Carlsbad, Calif.) Televantage station or trunk could be utilized. On a carrier-class level, a programmable Brooktrout, Inc. (Needham, Mass.) TR2020 VOIP gateway could be utilized.

The IP address of the subscriber 116 may be an IP address for a computer station, an IP-telephone, an IP mobile telephone, an IP-PBX, a SMTP address of a unified messaging system, a SMTP address of an e-mail system, or any similar type of address.

If the subscriber 116 is logged on to the Internet 112 and has indicated that she is available to receive telephone calls, a session will be established over the Internet 112 between the gateway 108 connected to the PSTN user and the subscriber 116, during which packets of information will be transmitted back and forth between the subscriber 116 and the gateway 108. The gateway 108 will be described in greater detail with reference to FIG. 2 below. If the subscriber 116 is not logged on at the time of the call, the call might be routed to an alternative call destination, such as an email server or a voicemail box or to some other IP-enabled device pursuant to the subscriber's directions.

Figure 2:
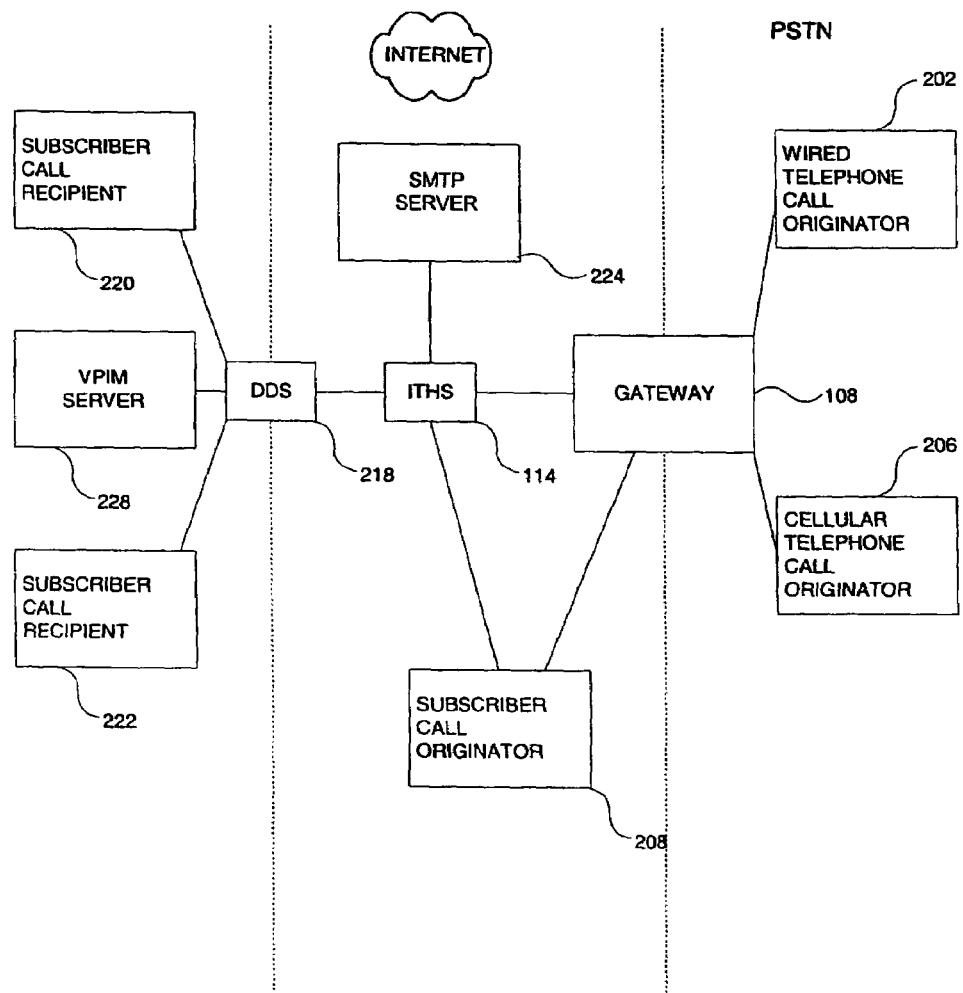
FIG. 2 is a block diagram illustrating the operation of a gateway in accordance with the present invention and calls between different originators and recipients.

FIG. 2 illustrates the operation of a gateway in accordance with the present invention, with respect to three different types of originating calls, a call from a wired telephone 202, a call from a cellular telephone 206, and a call from another subscriber 208, in each case where the subscriber call recipient is connected to a Digital Data Service ("DDS"). As noted above with respect to FIG. 1, a call from a wired telephone 202 or cellular telephone 206 must be connected to the gateway 108 by some type of local or cellular service, but in order to simplify FIG. 2, the telephones 202 and 206 are shown connected directly to the gateway 108. As shown in FIG. 2, devices located on the right side of the gateway 108 are connected to the PSTN, and devices located on the left side of the gateway 108, but to the left of the DDS, are connected to the Internet or a similar type of IP network.

Also, as described above with reference to FIG. 1, a subscriber must be logged on to the Internet to receive calls and have registered with the IP telephony network, i.e., indicated a readiness to receive calls, in order for a session to be created. The registration process may be initiated by the subscriber's IP telephony terminal (either a computer running a soft phone/IP telephony application, or a computer connected to a regular telephone and running an IP telephony application) or it may be requested by the IP telephony network, upon incoming call arrival, by employing a paging mechanism. Either way, the IP telephony application will typically open a Transfer Control Protocol ("TCP") socket to a File Transfer Protocol ("FTP") server (not shown) which resides on the subscriber's ISP network, in order to obtain the correct local IP address for that subscriber's terminal. If the IP address can be obtained and authenticated with the FTP server, the subscriber will then upload the file to a web server of the ISP provider. A service directory such as the ITHS 114 will then download the uploaded subscriber information from the FTP server using the HTTP protocol. The ITHS will then authenticate the IP address and publish the information. The information contained within the file includes an E.164 ID of the subscriber's terminal. If the connection to the ITHS 114 is acknowledged, a host file for all, or at least a subset of subscribers, within the ITHS 114 will be updated with the IP address and E.164 ID of the subscriber's terminal and the subscriber's status will be updated to In-Service. If for any reason the call cannot be connected to the subscriber, the subscriber's status will be updated to Not-In-Service.

The ITHS 114 actively operates to maintain current data on all subscribers. For example, ITHS 114 will routinely use the HTTP protocol to retrieve an HTML document including mapping data for other subscribers. The ITHS 114 will determine the IP address and E.164 ID for each subscriber, as well as the time they connected to the ITHS 114. The ITHS 114 will then attempt to connect to each subscriber. If the connection is acknowledged, the host file will be updated with the IP address and E.164 ID of the subscriber and the subscriber's status will be updated to In-Service. If the connection fails, the subscriber's status will be updated to Not-In-Service.

Although only two status states are described above, a subscriber's IP telephony terminal essentially has one of three different states. Each state has a certain level of readiness depending on the IP network to which the IP telephony terminal is connected. When in an "idle" state, no calls can be delivered to the IP telephony terminal of a subscriber. This can occur because the terminal is powered off or it is powered on but not connected to the IP network. When in this state, no dynamic IP address can be assigned to the terminal and no IP telephony calls can be delivered to it. When in a "standby" state, the IP telephony terminal is powered on and connected to the IP network and has an IP address assigned to it, but the IP telephony application is not running. In this state, no calls can be delivered to the IP telephony terminal. In the "ready" state, the IP telephony terminal is connected to the IP network, has an IP address assigned to it, and the IP telephony application has been invoked. Under such circumstances, the terminal is ready to receive an incoming IP telephony call.

Hence, once the terminal has established an IP network connection with the ITHS 114, thereby becoming part of the IP telephony network, in either the standby or ready state, the subscriber's IP telephony application, which for purposes of the present invention is referred to as a "client connector," essentially causes the IP address assigned to the terminal and the corresponding E.164 ID for that terminal to be published, as an HTML document or XML database, within the ITHS 114. Although there could be only a single ITHS 114, for scalability purposes, it would be preferable to have multiple ITHS distributed throughout the IP telephony network.

Since the mapping data is published to documents that can be read by any Internet browser, the information can be easily accessed via any enabled browser. The client connector also checks the status of other subscribers by checking to see if other subscribers have published their IP address and E.164 ID, and then updates the local file used by the client connector with their current IP addresses and E.164 IDs. Once the appropriate information has been published the IP telephony terminal is able to place and receive real-time voice calls between other published agents using easily recognizable telephone numbers rather then cryptic IP address.

For multiple subscribers sharing a common IP address, such as in a company or office building, the ITHS 114 might be connected to a DDS 218 that publishes mapping data for multiple subscribers and stores either static or dynamic data for each individual IP telephony subscriber. The gateway 108, as well as the various subscribers, also requests mapping data from the ITHS 114 for address resolution. Therefore, the main function of the ITHS 114 is to find and provide the IP address of the terminating IP telephony subscriber, when subscribers are in the ready or standby state, to any device requesting such information. When a call is to be delivered to a subscriber, such as subscriber 220 or 222, the ITHS 114 is consulted to determine the IP address for the called IP telephony subscriber. When a user is in the standby state, calls can be routed to an email server through the SMTP server 224, a voicemail box through the VPIM server 228 connected to the DDS 218, or any other similar addressable, IP-enabled device. The location of the SMTP server 224 and VPIM server 228 are for illustration purposes only. Each server could be accessible directly over the Internet, connected to the DDS, or accessible in any of a number of other manners.

Each ITHS 114 may include identical information, or different information depending on their physical location within the network and/or the subscribers served. The ITHS 114 could be configured as a stand-alone server connected to one or more gateways, as a partitioned portion of a server performing other functions, or even as an individual subscriber's terminal. If the function of the ITHS was configured within subscriber's terminals, the IP telephony network would largely operate in the same manner as the distributed information networks used to share music files. Likewise, there may be multiple gateways distributed throughout the network in a number of fashions, such as at each PSTN local office, one gateway may serve multiple PSTN local offices, or gateways may be located within PBX devices and other IP-enabled network devices.

As noted above, each subscriber terminal must be operating IP telephony software, such as the client connecter. The client connector could be very basic software that largely functions to enable a subscriber to publish mapped data, or the client connector could be used to perform a number of additional functions. For example, the client connector could be used to provide basic soft phone functionality (a function generally known in the art), or to create a user profile for a subscriber that provides a simple and effective mechanism for managing that subscriber's IP telephony activities. A user profile would also be published to the ITHS 114.

Figure 3:
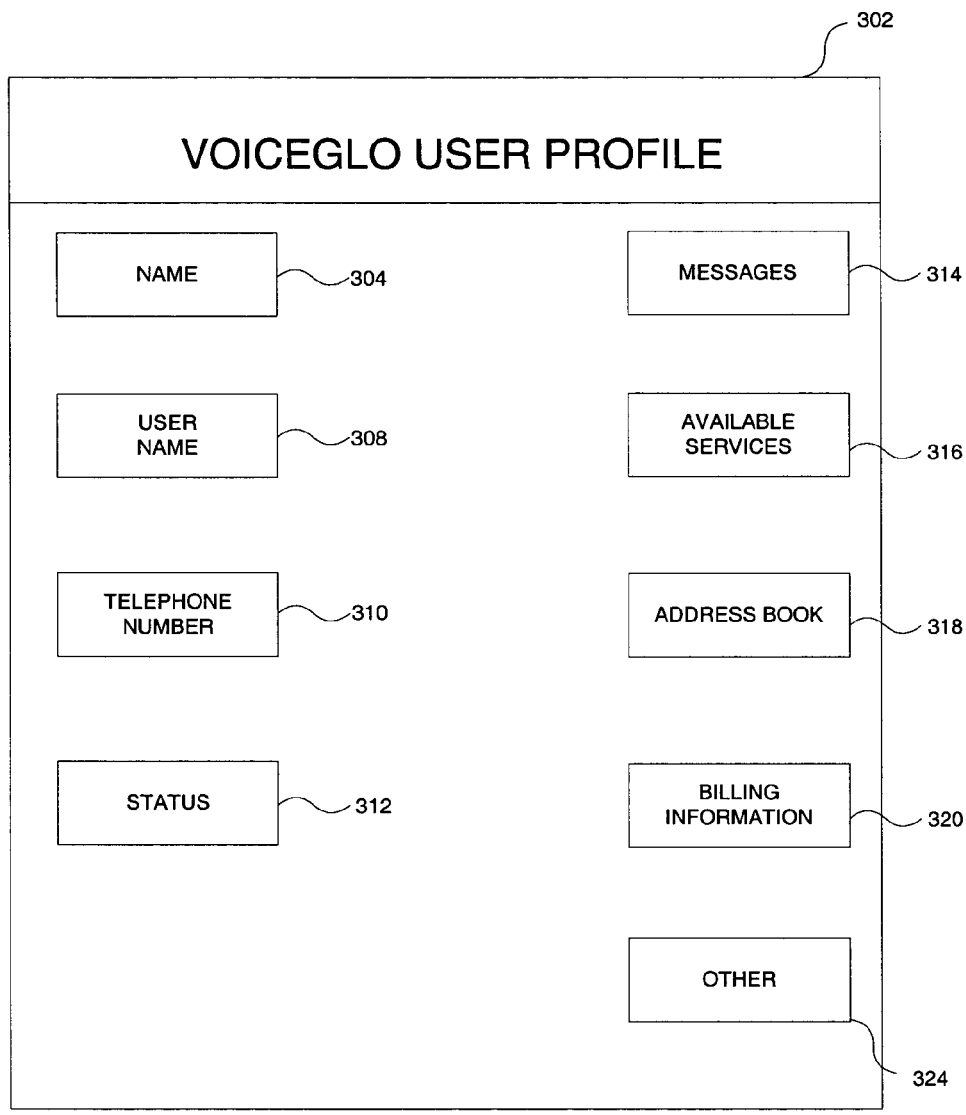
FIG. 3 illustrates a sample user profile in accordance with the present invention.

FIG. 3 illustrates an example of an IP telephony subscriber's profile 302, which is being housed on the ITHS 114. Although a variety of information may be included, with respect to the preferred embodiment of the present invention, an exemplary record for one subscriber would include: his or her full name 304; a user name 308; their E.164 number 310; their status 312; a message indicator 314 for messages they received when in a standby state; a list of available services 316 for that subscriber (which might include a number of Class 5 services, such as call waiting, three-way calling, etc.); an address book 316 that includes names and corresponding E.164 numbers for other subscribers; billing information 320 for use by the IP telephony service provider, such as a home address, and e-mail address or web address; and any type of other information 324 that might be desired.

Figure 4:
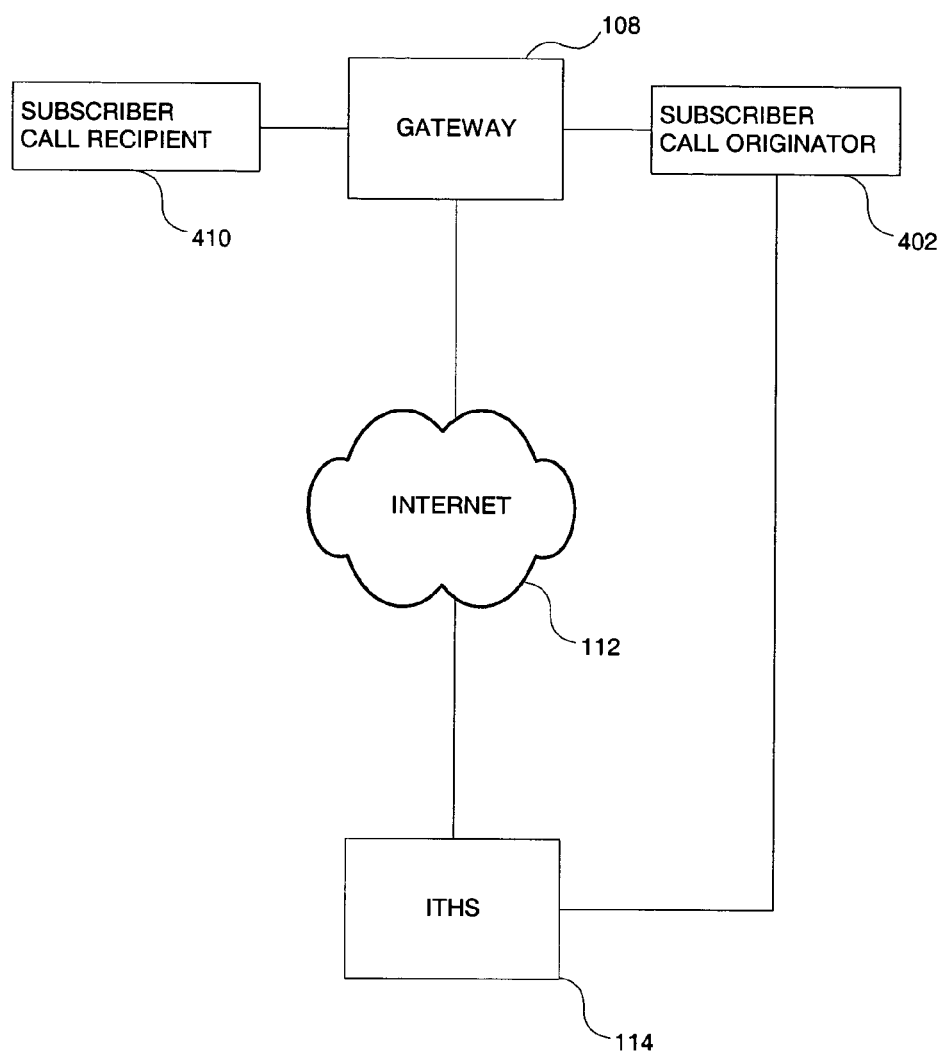
FIG. 4 is a block diagram illustrating the operation of a call between subscribers in accordance with the present invention.

The process of connecting a call originated by one subscriber to another subscriber in accordance with the preferred embodiment of the present invention is illustrated with reference to FIG. 4. When an IP Telephony subscriber 402 enters a telephone number or other unique identifier into their client connector software, a signal is sent to the gateway 108 over the Internet 112. The gateway looks up the IP address for the entered number in the ITHS 114, establishes a connection to the other IP telephony subscriber 410, and initiates a session between the two subscribers. When either party terminates the session, the gateway 108 removes the mapping data from its memory, even though the data may continue to exist within the ITHS. It is important that the gateway remain connected to both subscribers. In this manner, the gateway can monitor the length of the call for billing purposes and be available to perform other functions if needed. For example, if call waiting or another Class 5 service is enabled, the gateway will be able to manage the operations necessary to perform that function.

Figure 5:
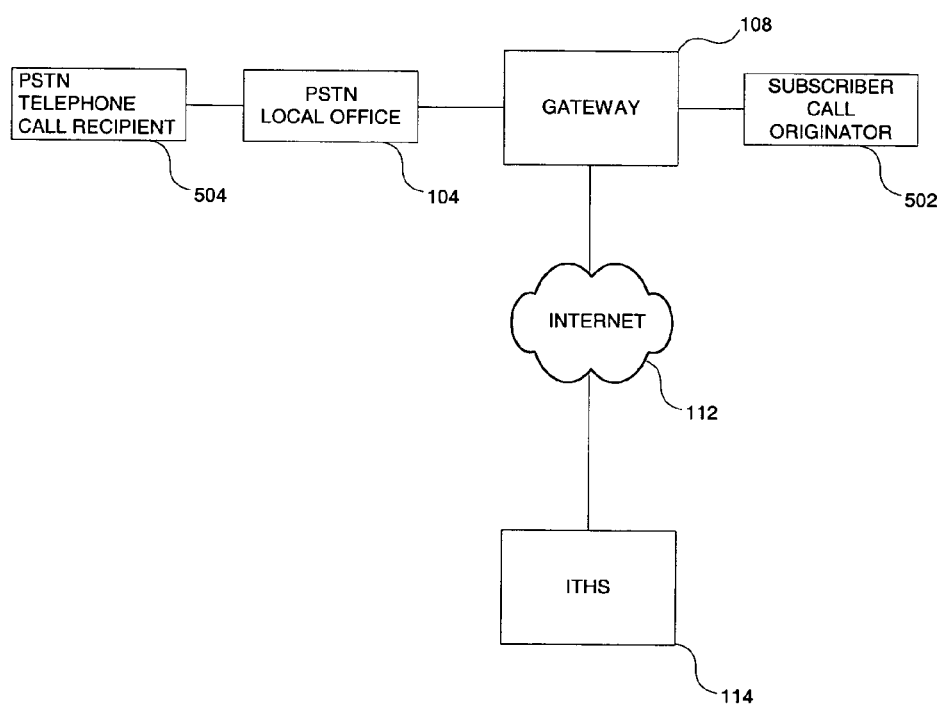
FIG. 5 is a block diagram illustrating the operation of a call originating from a user connected to an IP address-based network and terminating at a PSTN terminal in accordance with the present invention.

Referring now to FIG. 5, the process by which a subscriber 502 can call a non-subscriber 504 is illustrated. When the subscriber 502 enters a telephone number or other unique identifier within their client connector software, a signal is sent to a gateway 108 that causes the gateway 108 to locate the ITHS 114, which then consults a translation table to map the entered telephone number to a static IP address. The gateway 108 then establishes a direct circuit connection to the PSTN local office 104. A session is thereafter established between the subscriber 502 and the gateway 108, which gateway is in turn connected to the recipient 504 through a local office switch. The gateway 108 receives packets from the subscriber's terminal and converts the packet data to digital telephony signals and transports those signals over a digital circuit to the PSTN local office 104. The local office 104 then converts the digital telephony signals to analog voice signals and sends those signals to the recipient 504. Alternatively, the digital to analog conversion could be performed within the call recipient phone. When the recipient speaks, the recipient's voice is transmitted in either analog or digital form to the local office 104, converted to digital signals if transmitted in analog form, and transmitted to the gateway 108, where the digital data is converted to IP packets and sent to the subscriber 502. Once either party terminates the call, the session is terminated and the gateway removes the mapping information from its memory.

Figure 6:
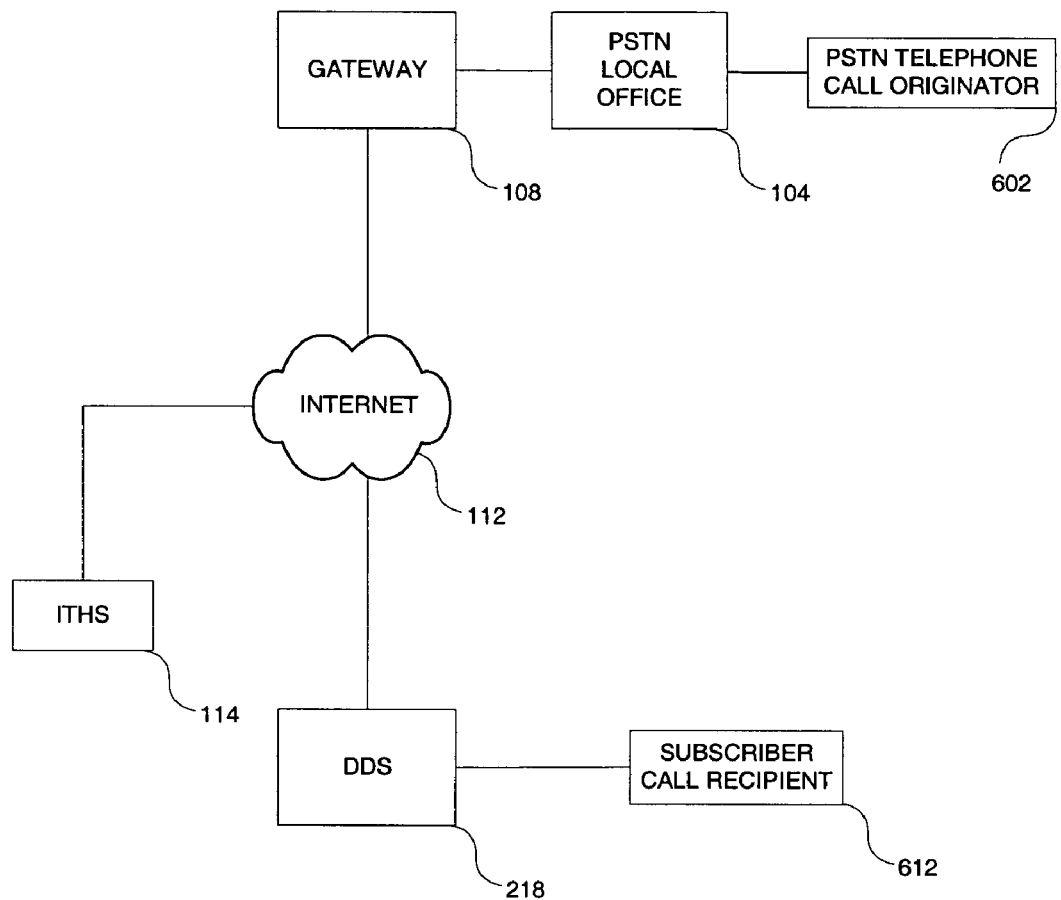
FIG. 6 is a block diagram illustrating the operation of a call originating from a PSTN terminal and terminating at a user of IP address-based network in accordance with the present invention.

A telephone call between a PSTN telephone call originator 602 and an IP telephony subscriber call recipient 612 is illustrated in FIG. 6. In this illustration, the call originator 602 dials a phone number on their standard phone or cellular phone, which sends a series of analog or digital signals to the PSTN local office 104. Based on the dialed number, the local office 104 establishes a direct connection to the gateway 108. If a cellular phone was used, then the cellular receiver/transmitter station would process the call and either connect directly to the gateway 108, or establish a connection to the local office 104, which would then establish a connection with the gateway 108. The gateway 108 would then send an E.164-to-IP-address mapping request to the ITHS 114. The ITHS 114 would identify that the E.164 number corresponds to an IP telephony subscriber and request the IP address information for that subscriber. A session would then be established between the subscriber 612 and the gateway 108, which is in turn connected to the call originator 602.

Although the present invention is described above in the context of a preferred embodiment, it is not limited as such and could be implemented in any of a number of alternative embodiments.

What is claimed is:

1. A process for notifying a user of an IP network of an IP address from a plurality of IP addresses corresponding to a plurality of terminals to facilitate telephony calls to at least one of said terminals from said user over an IP network, comprising the steps of:

obtaining said IP addresses for said terminals;

creating a plurality of files containing said IP addresses and corresponding to a plurality of users utilizing said terminals, said files being created on a server connected to said IP network;

publishing said files on said server; updating periodically said files to reflect a service status for one or more of said terminals; and allowing said user to access at least part of one of said files;

wherein said step of updating includes the step of periodically testing said terminals for said service status.

2. The process recited in claim 1, wherein each of said terminals has a unique IP address, and wherein said step of creating includes the step of creating said plurality of publicly accessible files on a plurality of servers connected to and distributed over said IP network.

3. The process recited in claim 1, wherein the service status is updated to a not-in service status if a telephony call cannot be connected to said terminal over said IP network.

4. A process for notifying a user of an IP network of an IP address from a plurality of IP addresses corresponding to a plurality of terminals to facilitate telephony calls to at least one of said terminals from said user over an IP network, comprising the steps of:

obtaining said IP addresses for said terminals;

creating a plurality of files containing said IP addresses and corresponding to a plurality of users utilizing said terminals, said files being created on a server connected to said IP network;

publishing said files on said server; updating periodically said files to reflect a service status for one or more of said terminals; and allowing said user to access at least part of one of said files;

wherein some of said terminals have a unique IP address and some of said terminals have a common IP address, and wherein said step of creating includes the step of creating said plurality of publicly accessible files on a plurality of servers connected to and distributed over said IP network.

5. The process recited in claim 4, wherein the service status is updated to a not-in service status if a telephony call cannot be connected to said terminal over said IP network.

6. A process for notifying a user of an IP network of an IP address from a plurality of IP addresses corresponding to a plurality of terminals to facilitate telephony calls to at least one of said terminals from said user over an IP network, comprising the steps of:

obtaining said IP addresses for said terminals;

creating a plurality of files containing said IP addresses and corresponding to a plurality of users utilizing said terminals, said files being created on a server connected to said IP network;

publishing said files on said server; updating periodically said files to reflect a service status for one or more of said terminals; and allowing said user to access at least part of one of said files; wherein some of said terminals have a unique IP address and some of said terminals have a common IP address, and wherein said step of creating includes said step of creating said plurality of publicly accessible files on a plurality of servers connected to and distributed over said IP network; and wherein said step of creating further includes the step of creating mapping data for each terminal among said terminals having a common IP address on one or more of said plurality of servers and wherein said step of publishing includes said step of publishing said mapping data on one or more of said plurality of servers to facilitate a telephony call between one of said terminals and one of said terminal corresponding to a common IP address.

7. The process recited in claim 6, wherein the service status is updated to a not-in service status if a telephony call cannot be connected to said terminal over said IP network.

* * * * *